United States Patent [19]
Carmody et al.

[11] Patent Number: 5,927,722
[45] Date of Patent: Jul. 27, 1999

[54] MECHANICAL SEAL

[75] Inventors: Christopher John Carmody, Doncaster; Andrew John Parkin; Christopher Newton, both of Rotherman, all of United Kingdom

[73] Assignee: AES Engineering Limited, South Yorkshire, United Kingdom

[21] Appl. No.: 08/844,203

[22] Filed: Apr. 18, 1997

[30] Foreign Application Priority Data

Apr. 20, 1996 [GB] United Kingdom .................. 9608252

[51] Int. Cl.$^6$ .......................................... F16J 15/34
[52] U.S. Cl. ........................................ 277/368; 277/371
[58] Field of Search .................... 277/361, 368, 277/371, 375, 423; 415/230, 231, 174.3, 174.2

[56] References Cited

U.S. PATENT DOCUMENTS

| | | | |
|---|---|---|---|
| 2,882,830 | 4/1959 | McDuffie | 277/371 X |
| 3,762,724 | 10/1973 | Porter | 277/374 |
| 4,294,453 | 10/1981 | Inouye et al. | 277/375 X |
| 4,377,290 | 3/1983 | Netzel | 277/368 |
| 4,501,429 | 2/1985 | White | 277/368 |
| 4,586,719 | 5/1986 | Marsi et al. | 277/361 X |
| 4,669,738 | 6/1987 | Netzel | 277/368 X |
| 4,815,747 | 3/1989 | Wolford | 277/375 X |
| 4,989,882 | 2/1991 | Warner et al. | 277/11 |
| 5,324,048 | 6/1994 | Carmody | 277/371 |
| 5,344,164 | 9/1994 | Carmody et al. | 277/371 |
| 5,441,282 | 8/1995 | Ciotola | 277/85 |
| 5,529,315 | 6/1996 | Borrino et al. | 277/361 X |
| 5,605,436 | 2/1997 | Pedersen | 277/368 X |

FOREIGN PATENT DOCUMENTS

| | | |
|---|---|---|
| 1 471 891 | 4/1977 | United Kingdom . |
| 2 260 378 | 4/1993 | United Kingdom . |

OTHER PUBLICATIONS

"Installation, Operation and Maintenance of Mark III Nonmetallic Process Pump" by Duriron Co. Inc. Product Bulletin P–16–200a pp. 12–17. (Published before Apr. 1997).

Primary Examiner—Lynne Reichard
Assistant Examiner—John R. Cottingham
Attorney, Agent, or Firm—Renner, Kenner, Greive, Bobak, Taylor & Weber

[57] ABSTRACT

A cartridge seal having a sleeve for fitting over a pump shaft and, at one end region of the sleeve, a stationary seal whose floating component is biased towards its static component. The cartridge further includes a member longitudinally spaced from the seal, which member and the stationary seal are moveable longitudinally relative to one another. The floating component is biased away from said member and towards the static component, means being provided to limit separation of said member and the stationary seal. The invention therefore provides a complete mechanical seal in one cartridge.

18 Claims, 2 Drawing Sheets

MECHANICAL SEAL

BACKGROUND OF THE INVENTION

1. Field of the Invention

This invention relates to package or cartridge mechanical seals for providing a fluid tight seal between a rotatable shaft and a housing. This invention relates especially but not exclusively to such seals for use with pumps, especially centrifugal pumps, in which the cartridge seal is located within the housing and extends along the shaft. Although reference is made herein to centrifugal pumps, it should be understood that mechanical seals of the invention have use in other mechanical seal applications.

2. Brief Description of the Related Art

A conventional mechanical seal comprises a "floating" component which is mounted axially movably around the rotary shaft of, for example, a pump and a "static" component which is axially fixed, typically by being secured to a housing. The floating component has a flat annular end face, i.e. its seal face, directed towards a complementary seal face of the static component. The floating component is urged towards the static component to close the seal faces together to form a sliding face seal, usually by means of one or more springs. In use, one of the floating and static components rotated; this component is therefore referred to as the rotary component. The other of the floating and static components does not rotate and is referred to as the stationary component.

The rotary and stationary components may also be referred to as the rotational and non-rotational components (or portions) of a seal, respectively.

Those seals whose floating component is rotary are described as rotary seals. If the floating component is stationary the seal is referred to as a stationary seal.

The radially inner side of a sliding face seal may in use be supplied with a barrier fluid, which serves to protect against possibly noxious liquid which may leak through the seal from contacting pump parts in undiluted form as well as to cool and lubricate the seal. A second seal is required to keep the barrier fluid to its proper place on the radially inner side of the sliding face seal. The entire seal device is therefore a double mechanical seal or, more simply, a double seal.

Mechanical seals may be assembled in situ from separate pieces or sub-assemblies. However, it is more convenient for the user for a seal to be assembled in the factory into a self-contained unit, customarily referred to as a cartridge.

A representative prior art seal for a centrifugal pump is that sold by Durametallic Corp. under the designation "Double-HS/RA-Seal". This is a double seal for mounting around a pump shaft extending through a bore in the housing of a centrifugal pump. The seal components are held together in the form of a cartridge, except for a rotary static sliding face seal component to be installed in the back of the pump impeller and for two O-rings associated with said component. The cartridge comprises a sleeve which can be fitted over the pump shaft and around which the other cartridge components are arranged, and which is installed by being pressed by hand into the bore in the housing. The cartridge then comes to rest against a shoulder provided on the pump housing. The location of the cartridge must be measured and compared with the manufacturer's instructions. The rotary static component separate from the cartridge is installed in the back of the impeller, which is then secured to the shaft, in this case by mating of an internal screw thread of the impeller with an external screw thread at the free end of the shaft. Such seals, therefore, are not convenient to install and great care is required to ensure that the seal is installed to match the longitudinal clearance of the pump.

SUMMARY OF THE INVENTION

It is an object of the invention to provide a seal for installation around a shaft extending through a bore in a housing which is more convenient and reliable to install than prior art seals. In another aspect, it is an object of the invention to provide a seal for installation around a shaft extending through a bore in a housing which can readily be used with different longitudinal clearances as occur in practice between the housing and the impeller or the like secured at the end of the shaft. In this latter respect, problems arise in the installation and adjustment of in-housing seals because of differences in longitudinal clearance between the housing and the impeller or the like which is fixed to the shaft. These differences might arise as between one pump and another of similar type due to manufacturing dimensional differences, as a result of wear due to running the pump over a considerable period or because of specific setting requirements due to operational defects. Known seals are such that considerable time and effort is required to accommodate these different clearances. It is an object of the invention, therefore, to provide a seal for installation around a shaft extending through a bore in a housing which can accommodate different clearances.

The present invention in one aspect is a cartridge seal having a sleeve for fitting over a pump shaft and, at one end region of the sleeve, a stationary seal whose floating component is biased towards its static component. The cartridge further includes a member longitudinally spaced from the seal, which member and the stationary seal are moveable longitudinally relative to one another. The floating component is biased away from said member and towards the static component, means being provided to limit separation of said member and the stationary seal. The invention therefore provides a complete mechanical seal in one cartridge.

In use, said member abuts a part of a pump housing and the stationary seal abuts an impeller or the like. The pump is therefore capable of accommodating different clearances between the impeller or the like and the pump housing part abutted by the cartridge. Accordingly, the invention provides a seal for installation in a housing bore in the form of an easy-to-install cartridge readily fitted in pumps of similar type which have different clearances. Typically, the stationary seal is moveable with respect to the sleeve whilst said member is fixed with respect thereto. The cartridge seal may be a double seal.

The invention also provides a cartridge seal for mounting around a rotatable shaft extending through a bore defined in a pump housing, comprising:

a sleeve member for securing directly or indirectly to the shaft for rotation therewith and against longitudinal movement relative thereto;

around an end portion of the sleeve member a seal comprising an axially outer rotary component and an axially inner stationary component, a sliding face seal being formed between the two components;

a ring member which is disposed around the sleeve at a position longitudinally spaced from the stationary component and axially inward thereof, the seal and the ring member being relatively longitudinally moveable;

biasing means for urging the seal and the ring member away from each other; and stop means for limiting movement of the seal and the ring member away from each other.

Preferably, the seal is longitudinally moveable with respect to the sleeve member and the ring member is fixed with respect to the sleeve member.

In preferred cartridges, the seal is moveable relative to the sleeve and the stop means comprises means arranged to cooperate with the rotary component of the seal as it moves away from the ring member such as to limit movement of the seal from the ring member. In a preferred class of seals the stop means comprises a flanged ring having an annular portion disposed between the rotary component and the sleeve member, the flanged ring having at an end thereof a radially outwardly projecting flange, the outwardly projecting flange being axially outward of, and radially overlapping with, the rotary component, and the flanged ring further having a radially inwardly projecting flange spaced axially inwardly from a flange extending radially outwardly from the sleeve member and radially overlapping with said inwardly projecting flange.

The biasing means normally comprises a coil spring. The sleeve member is typically to be secured indirectly to the shaft by attachment to an inner sleeve fixed around the shaft.

As has already been stated, the cartridge seal may be a double seal. Thus, many cartridge seals of the invention further comprise a second seal around a portion of the sleeve member on the axially distal side of the ring member with respect to said first seal, the second seal comprising a stationary component proximal to the ring member and a rotary component distal to the ring member, a sliding face seal being formed between the two components and the stationary component being fixed with respect to the ring member.

In another aspect, the invention provides a double cartridge seal for a centrifugal pump having an impeller which is removably secured to the shaft end, comprising two seals. Each of the two seals is arranged around a sleeve member and has a rotating portion and a non-rotating portion. The two non-rotating portions are longitudinally adjacent and mounted for limited longitudinal movement relative to each other and are biased apart by biasing means. The sleeve member is adapted to be secured to the shaft for rotation therewith and against longitudinal movement relative thereto, and to be capable when it is non-securely on the shaft and the impeller is secured to the shaft end of limited longitudinal movement with respect to the shaft, the rotating portion of one of the seals being longitudinally fixed with respect to the sleeve member and the rotating portion of the other of the seals being arranged for limited longitudinal movement relative to the sleeve member.

In preferred embodiments the rotating portion of that one of the two seals which is to be remote from the impeller comprises a ring through which and the sleeve member extend in use grub screws for securing the sleeve member to the shaft.

Preferably, the seal whose rotating portion is longitudinally fixed relative to the sleeve member is the rotating portion of the seal remote from the impeller in use.

In another class of preferred seals, there is provided radially inwardly of the rotating portion of the seal in use adjacent the impeller a flanged ring having at one longitudinal end a radially outwardly extending flange arranged to be adjacent the impeller and its other end a radially inwardly extending flange overlapping in a radial direction with a radially outwardly extending flange provided at the end of the sleeve member and positioned axially outwardly of the inward flange of the flanged ring. The inner circumference of the flanged ring, the inward flange of the flanged ring, the outer circumference of the sleeve member and the outward flange of the sleeve member having defined therebetween a space containing an O-ring, the flanged ring being fixed against longitudinal movement relative to the rotating portion and the sleeve member being capable of longitudinal movement relative to the rotating portion.

Another aspect of the invention resides in a cartridge seal for providing a seal between a rotatable shaft of a centrifugal pump having an impeller which is removably secured to the shaft and a pump housing in which the cartridge is in use located. The cartridge comprises a sleeve member at one end of which a seal is arranged around the sleeve member, the seal comprising an axially outer rotating portion which in use engages, and rotates with, the impeller and an axially inner non-rotating portion and the sleeve member being adapted to be secured to the shaft for rotation therewith and against longitudinal movement relative thereto. The non-rotating and rotating portions are mounted for limited longitudinal movement relative to a ring which is longitudinally fixed with respect to the sleeve member and which in use abuts a shoulder of the housing. The non-rotating portion is biased away from the ring by biasing means, whereby the distance between the shoulder and the impeller may be varied, the sleeve member being capable, when it is non-securedly on the shaft, the impeller is secured on the shaft end and the ring abuts the shoulder, of limited longitudinal movement with respect to the shaft.

BRIEF DESCRIPTION OF THE DRAWINGS

An embodiment of the present invention will now be described, by way of example only, and with reference to the accompanying drawings, in which.

DESCRIPTION OF THE PREFERRED EMBODIMENTS

Figure 1:
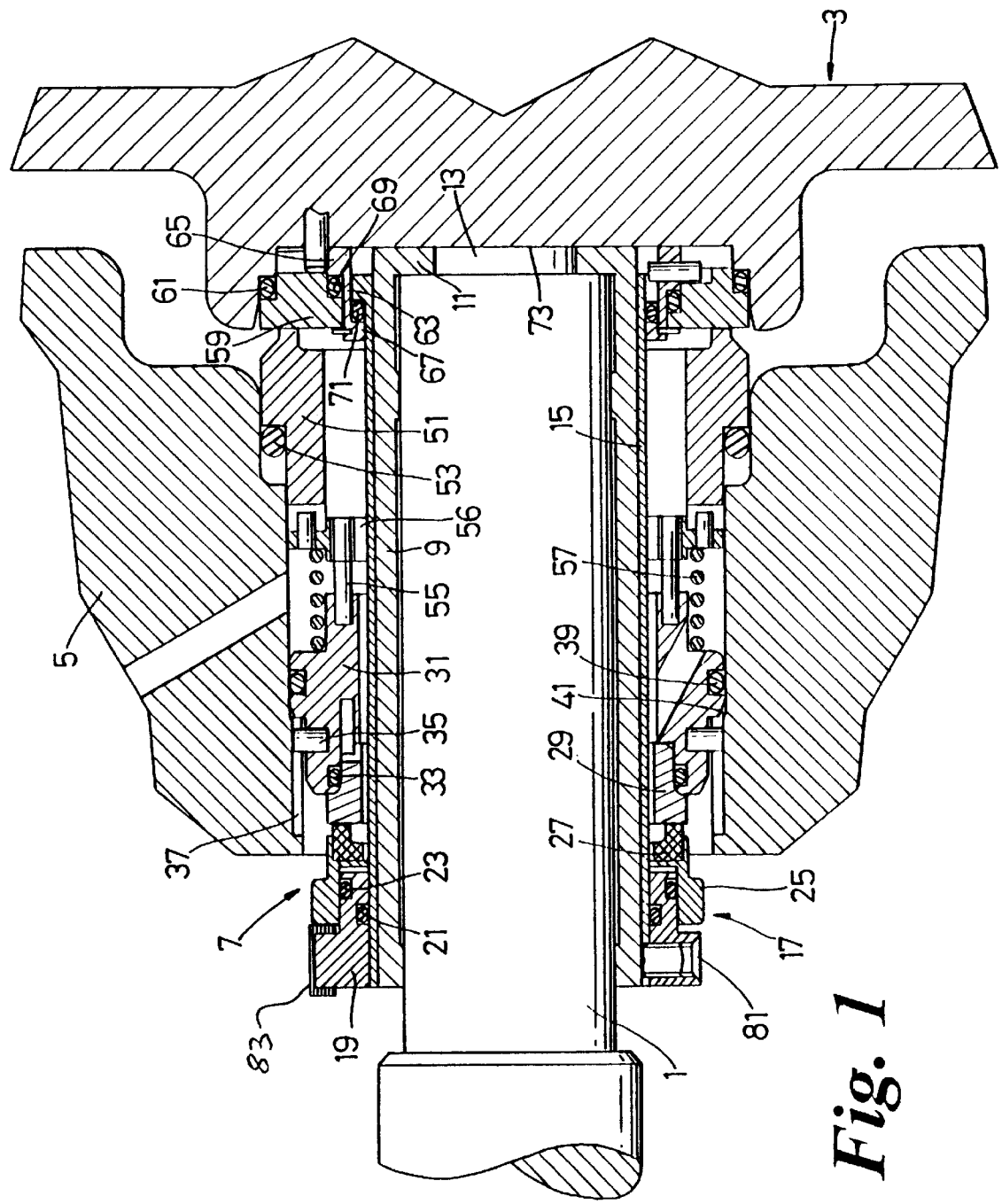
FIG. 1 shows a cartridge seal of the present invention installed with maximum longitudinal clearance between the housing and the impeller.

Referring to the accompanying drawings, a centrifugal pump includes a drive shaft 1, an impeller 3 and a pump housing 5. The impeller 3 is removably secured to the free end of the pump shaft 1, suitably by mating of an external screw thread on the shaft in a threaded bore in the impeller 3 or, in the illustrated embodiment, by mating of an externally threaded spindle of the impeller 3 in a threaded bore in the drive shaft 1. The pump itself is not novel, and the manner of coupling the impeller 3 to the drive shaft 1 is not part of the invention and is not illustrated. In this case the pump is exposed to corrosive or toxic liquids and the impeller 3 is made of non-metallic material. A cartridge seal 7 is of the double seal type arranged in a tandem configuration and is intended to seal against leakage of fluid. In this case, the seal parts potentially exposed to the pumped liquid, and especially the stationary seal described below, are made of chemically resistant material such as ceramics or carbon.

The pump drive shaft 1 in the illustrated embodiment is provided with an inner sleeve member 9 which locates directly on the shaft 1 and rotates therewith, as the skilled reader will know. The sleeve 9 includes a radially inwardly directed annular flange 11 which lies between the end of the shaft 1 and a central recess 13 of the impeller 13. (In this case, the recess 13 surrounds the externally threaded spindle of the impeller 13).

Surrounding the inner sleeve member 9 over nearly its entire length is an outer sleeve member 15 which, when the pump is made ready for operation, is firmly secured to the inner sleeve member 9 both for rotation therewith and against longitudinal movement relative thereto. The outer sleeve 15 is part of the cartridge seal 7.

At that end of the outer sleeve member 15 remote from the impeller 3, there is mounted the rotating part 17 of the first of the two seals within the cartridge 7. The rotating part (or rotary component) 17 includes a ring 19 which is provided with O-rings 21, 23. At least one helical coil spring (which for clarity is not shown) is located between the rings 17 and 19. The O-ring 21 is in sealing engagement with the outer sleeve member 15 and the O-ring 23 is in sealing engagement with a further ring 25 which carries a sealing face member 27. The sealing face of the sealing face member 27 engages a corresponding sealing face on a sealing face member 29 forming part of the non-rotating portion (or static component) of the seal. The sealing face member 29 is attached to a ring 31, and an O-ring 33 carried by the ring 31 provides sealing engagement therebetween. The ring 31 is held to the housing 5 to prevent rotation therebetween by pins 35 locating in axial slots 37. An O-ring 39 provides sealing engagement between the housing 5 and the ring 31.

The ring 31 includes a shoulder which abuts against a corresponding, radially inwardly projecting shoulder 41 on the housing 5.

A setting clip 83 is used during installation to set the optimum space between the rings 19 and 25. The clip is removed prior to use.

The other seal of the double seal cartridge 7 is a stationary seal which has a non-rotating portion including a sealing ring member 51 which is in sealing engagement with the housing 5 by means of O-rings 53. The ring member 51 is linked to the ring 31 of the other seal by means of drive pins 55 which are fixedly secured within ring 31 and make rotational engagement with the non-rotating portion of the other seal by means of an additional plate 56 which contains slots into which pins 55 extend.

Extending between the two static components (non-rotating portions) of the seals is a coil spring 57 which biases the two non-rotating portions away from each other and towards their corresponding rotating portion (rotary component).

The ring 51 is provided with a sealing face which makes contact with a corresponding face of a sealing ring member forming part of the rotating portion of the second seal. An O-ring 61 provides sealing engagement between the sealing ring member 59 and the impeller 3. Located radially inwardly of the sealing ring member 59 is a ring 63 having a radially outwardly extending flange 65 adjacent the impeller 3 and a radially inwardly extending flange 67 adjacent the outer sleeve member 15. A further O-ring 69 is located in the space defined between the ring 63 and the sealing ring member 59 and provides sealing engagement therebetween. An O-ring 71 provides a seal between the ring 63 and the outer sleeve member 15.

It will be appreciated that the drawings illustrate a cartridge seal 7 having a sleeve 15 for fitting over a pump shaft I and, at one end region of the sleeve 15, a stationary seal comprising a static floating component which includes the ring member 51 and a rotary static component which includes the ring member 59. The floating component is biased towards the static component. The cartridge 7 further includes a member comprising the ring 31 longitudinally spaced from the seal, which member and the stationary seal 51, 59 are moveable longitudinally relative to one another. The floating component 51 is biased away from said ring 31 and towards the static component 59. Means comprising the ring 63 are provided to limit separation of said ring 31 and the stationary seal 51, 59. The invention therefore provides a complete mechanical seal in one cartridge. The spacing between the ring 31 (and hence the shoulder 41) and the stationary seal 51, 59 (and hence the impeller 3) is variable, enabling the cartridge to accomodate different clearances between the shoulder 41 and the impeller 3

Figure 2:
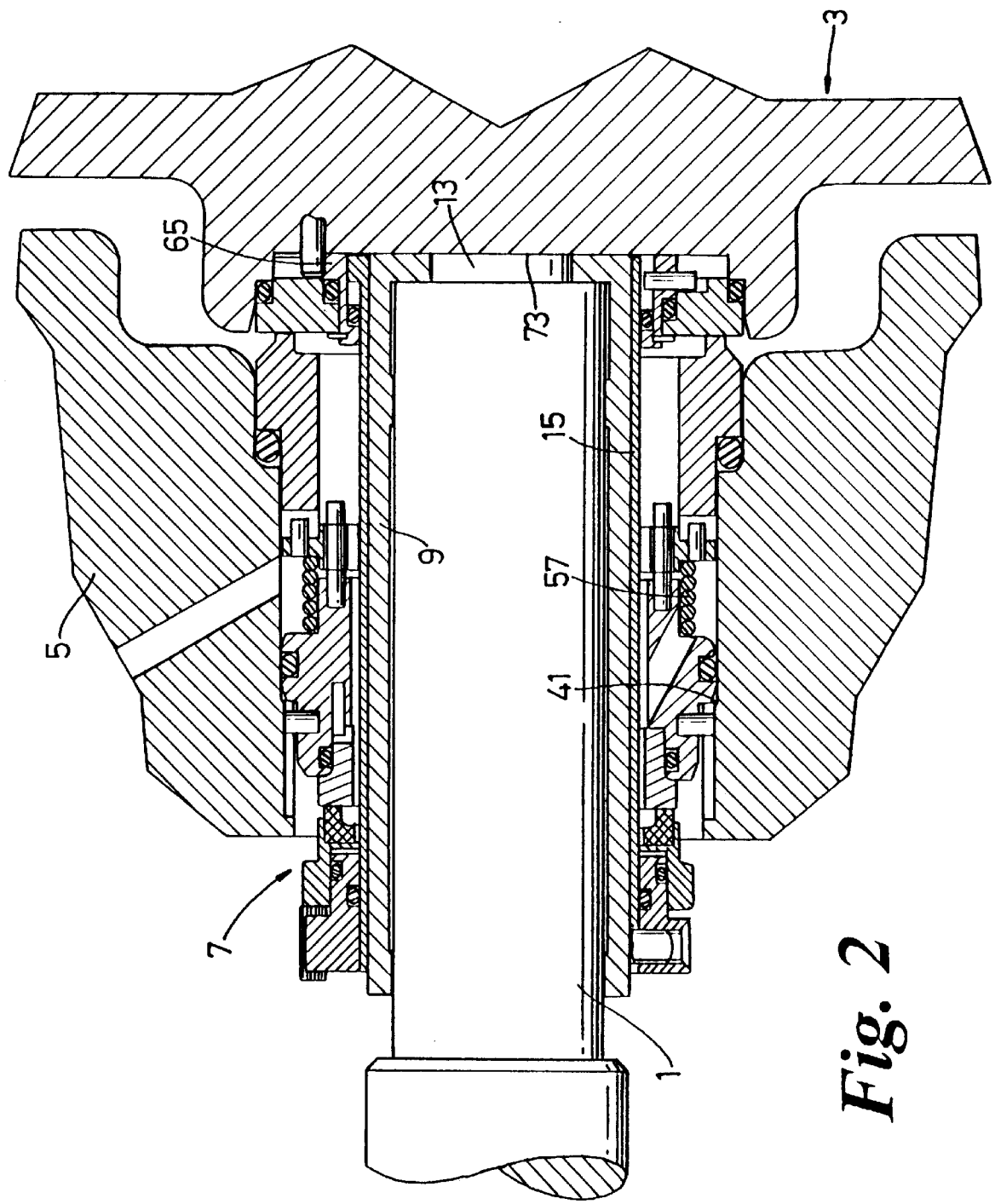
FIG. 2 shows the cartridge seal of FIG. 1 installed with minimum longitudinal clearance between the housing and the impeller.

By comparing FIG. 1 with FIG. 2, it can be seen that the longitudinal clearance between the impeller 3 and the housing 5, at the closest points, is substantially greater in FIG. 1 than it is in FIG. 2. Strictly, the important distance difference is between the shoulder 41 of the housing 5, against which the seal cartridge 7 abuts, and the inner face 73 of the impeller 3 against which the seal cartridge through flange of the ring 63, also abuts. FIG. 1 shows the cartridge as it appears when this distance is at the maximum which can be handled by the cartridge. FIG. 2 shows the seal cartridge at the corresponding minimum for this distance. In an overall cartridge length of about 5 inches, a difference in this distance of about 0.15 inch may be accommodated.

Referring to FIG. 1, the maximum distance between the shoulder 41 of the housing 5 and the inner face 73 of the impeller 3 is accommodated by fixing the outer sleeve member 15 to inner sleeve member 9, using grub screws 81 extending through ring 19 and outer sleeve member 15, with that end of the outer sleeve member 15 remote from the impeller 3 aligned radially with a corresponding end of the inner sleeve member 9. It will also be seen in FIG. 1 that the two seals are relatively widely spaced apart, as indicated by the separation of the coils of coil spring 57.

Referring to FIG. 2, the minimum distance between the shoulder 41 of the housing 5 and the inner face 73 of the impeller 3 is accommodated by the seal cartridge by fixing the outer sleeve member 15 to the inner sleeve member 9 at a position in which the impeller end of the outer sleeve member 15 lies close to the inner face of the impeller 3. In this position the two seals lie relatively close together as indicated by the proximity between the coils of the coil spring 57.

In some embodiments of the invention, the drive shaft 1 within the ring 51 is provided with turbulence-inducing means, eg a thread, to promote flow of barrier fluid.

In a modification of the illustrated embodiment, the cartridge is a single seal cartridge omitting the first seal. In particular, the sealing face members 27 and 29 and the O-rings associated with their seal may be omitted.

By providing such axial adjustability in a cartridge seal of this type, the cartridge can be easily and accurately installed and adjustments to the pump shaft can be easily made to accommodate changes which take place during the operation of the pump.

We claim:

1. A cartridge seal for mounting a rotatable shaft extending through a bore defined in a pump housing, said cartridge seal comprising:

a sleeve member for securing directly or indirectly to the shaft for rotation therewith and against longitudinal movement relative thereto;

around an end portion of the sleeve member, a first seal comprising an axially outer rotary component having a first sealing face portion and an axially inner stationary component having a second sealing face portion in sliding engagement with the first sealing face portion to form a sliding face seal between the two components;

a ring member disposed around the sleeve at a position longitudinally spaced from the stationary component axially inward thereof, the first seal and the ring member being relatively longitudinally moveable;

biasing means for urging the first seal and the ring member away from each other; and stop means for limiting movement of the seal and the ring member away from each other, the stop means including a flanged ring having an annular portion disposed between the rotary component and the sleeve member, the flanged ring having, at an end thereof, a radially outwardly projecting first flange, the outwardly projecting first flange being axially outward of, and radially overlapping with, the rotary component, and the flanged ring further having a radially inwardly projecting second flange spaced axially inwardly from a third flange extending radially outwardly from the sleeve member and radially overlapping with the inwardly projecting second flange.

2. A cartridge seal of claim 1 wherein the first seal is longitudinally moveable with respect to the sleeve member and the ring member is fixed with respect to the sleeve member.

3. A cartridge seal of claim 2 wherein the biasing means comprises a coil spring.

4. A cartridge seal of claim 3 wherein the sleeve member is indirectly secured to the shaft by attachment to an inner sleeve fixed around the shaft.

5. A cartridge seal of claim 2 further comprising a second seal around a portion of the sleeve member on the axially distal side of the ring member with respect to said first seal, the second seal comprising a stationary component proximal to the ring member and a rotary component distal to the ring member, a sliding face seal being formed between the stationary and rotary components of the second seal, and the stationary component being ring with respect to the ring member.

6. A cartridge seal of claim 1 further comprising a second seal around a portion of the sleeve member on the axially distal side of the ring member with respect to said first seal, the second seal comprising a stationary component proximal to the ring member and a rotary component distal to the ring member, a sliding face seal being formed between the stationary and rotary components of the second seal, and the stationary component being ring with respect to the ring member.

7. A cartridge seal of claim 1, wherein the sleeve member is adapted to be secured to the shaft at different longitudinal positions.

8. A cartridge seal of claim 7, wherein the sleeve member is so adapted in that it has defined therein a bore to receive a set screw by which it may be attached to the shaft or a member intermediate the sleeve member and the shaft, with respect to which shaft is fixed.

9. A cartridge seal of claim 2, wherein the sleeve member is adapted to be secured to the shaft at different longitudinal positions.

10. A cartridge seal of claim 9 further comprising a second seal around a portion of the sleeve member on the axially distal side of the ring member with respect to said first seal, the second seal comprising a stationary component proximal to the ring member and a rotary component distal to the ring member, a sliding face seal being formed between the stationary and rotary components of the second seal, and the stationary component being ring with respect to the ring member.

11. A double cartridge seal for a centrifugal pump having an impeller which is removably secured to an end of a shaft, comprising two seals, each of the two seals being arranged around a sleeve member and having a rotating portion and a non-rotating portion, the two non-rotating portions being longitudinally adjacent and mounted for limited longitudinal movement relative to each other and being biased apart by biasing means, the sleeve member being adapted to be secured to the shaft for rotation therewith and against longitudinal movement relative thereto and to be capable of limited longitudinal movement with respect to the shaft when the sleeve member is non-securedly on the shaft and the impeller is secured to the shaft end, the rotating portion of one of the seals being longitudinally fixed with respect to the sleeve member and the rotating portion of the other of the seals being arranged for limited longitudinal movement relative to the sleeve member, and wherein radially inwardly of the rotating portion of the seal in use adjacent the impeller there is provided a flanged ring having at one longitudinal end a radially outwardly extending first flange arranged to be adjacent the impeller and at its other end, a radially inwardly extending second flange overlapping in a radial direction with a radially outwardly extending third flange provided at the end of the sleeve member and positioned axially outwardly of the inward second flange of the flanged ring, the flanged ring being fixed against longitudinal movement relative to the rotating portion of the one of the two seals and the sleeve member being capable of longitudinal movement relative to that same rotating portion.

12. A cartridge seal of claim 11 wherein the sleeve member is adapted to be indirectly secured to the shaft by attachment to an inner sleeve member.

13. A cartridge seal of claim 11, wherein the rotating portion of that one of the two seals which is to be remote from the impeller comprises a ring through which the sleeve member extends in use and grub screws for securing the sleeve member to the shaft.

14. A cartridge seal of claim 11, wherein the biasing means comp rises a coil spring by which the two non-rotating portions are biased away from each other and towards their respective rotating portion.

15. A cartridge seal of claim 11 wherein the seal whose rotating portion is longitudinally fixed relative to the sleeve member is the rotating portion of the seal remote from the impeller in use.

16. A cartridge seal of claim 11, wherein the inner circumference of the flanged ring, the inward second flange of the flanged ring, the outer circumference of the sleeve member and the outward third flange of the sleeve member have defined therebetween a space containing an O-ring.

17. A cartridge seal for providing a seal between a rotatable shaft of a centrifugal pump having an impeller which is removably secured to the shaft and a pump housing in which the cartridge is in use located, comprising a sleeve member: a first seal arranged around one end of the sleeve member, wherein the first seat comprises an axially outer rotating portion which, in use, engages and rotates with the impeller; and an axially inner non-rotating portion; and wherein the sleeve member is adapted to be secured to the shaft for rotation therewith and against longitudinal movement relative thereto, the non-rotating and rotating portions being mounted for limited longitudinal movement relative to a ring which is longitudinally fixed with respect to the sleeve member and which, in use, abuts a shoulder of the housing, the non-rotating portion being biased away from the ring by biasing means, whereby the distance between the shoulder and the impeller may be varied, the sleeve member being capable of limited longitudinal movement with respect to the shaft, when the sleeve member is non-securedly on the shaft, the impeller is secured on the shaft end and the ring abuts the shoulder and wherein the first seal further comprises a flanged ring having an annular portion disposed between the rotating portion of the first seal and the sleeve member, the flanged ring having at one longitudinal end a radially outwardly extending first flange arranged to be adjacent the impeller and, at its other end, a radially inwardly extending second flange overlapping in a radial direction with a radially outwardly extending third flange provided at the end of the sleeve member and positioned axially outwardly of the inward second flange of the flanged ring, the flanged ring being fixed against longitudinal movement relative to the rotating portion and the sleeve member being capable of longitudinal movement relative to the rotating portion.

18. A cartridge seal of claim 17 which is a double seal, a second seal being provided on the axially distal side of the ring with respect to the first seal and having a non-rotating portion proximal to the ring and longitudinally fixed with respect thereto, whereby the non-rotating portions of the first and second seals are biased apart and mounted for limited longitudinal movement relative to each other, and wherein the inner circumference of the flanged ring, the inward second flange of the flanged ring, the outer circumference of the sleeve member and the outward third flange of the sleeve member have defined therebetween a space containing an O-ring.

* * * * *

UNITED STATES PATENT AND TRADEMARK OFFICE
CERTIFICATE OF CORRECTION

PATENT NO : 5,927,722
DATED    : July 27, 1999
INVENTOR(S): Carmody et al.

It is certified that error appears in the above-identified patent and that said Letters Patent is hereby corrected as shown below:

Claim 17
Column 8, line 54, "seat" should be --seal--

Signed and Sealed this

Sixth Day of February, 2001

Attest:

Q. TODD DICKINSON

*Attesting Officer*          *Director of Patents and Trademarks*